United States Patent
Oh et al.

(10) Patent No.: US 9,977,491 B2
(45) Date of Patent: *May 22, 2018

(54) METHOD FOR INTERACTING WITH FLEXIBLE DEVICE AND USER TERMINAL THEREOF

(71) Applicant: Samsung Electronics Co., Ltd., Suwon-si (KR)

(72) Inventors: Byung Tae Oh, Seoul (KR); Hong Pyo Kim, Goyang-si (KR); Ho Young Lee, Suwon-si (KR); Seung Hoon Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 15/177,661

(22) Filed: Jun. 9, 2016

(65) Prior Publication Data

US 2016/0291686 A1 Oct. 6, 2016

Related U.S. Application Data

(63) Continuation of application No. 14/016,554, filed on Sep. 3, 2013, now Pat. No. 9,377,847.

(30) Foreign Application Priority Data

Dec. 27, 2012 (KR) .......................... 10-2012-0154842

(51) Int. Cl.
*G06F 3/041* (2006.01)
*G06F 3/00* (2006.01)
(Continued)

(52) U.S. Cl.
CPC ............ *G06F 3/002* (2013.01); *G06F 1/1652* (2013.01); *G06F 3/017* (2013.01); *G06F 3/0487* (2013.01); *H04M 1/0268* (2013.01); *H04M 1/7253* (2013.01); *G06F 2203/04102* (2013.01); *G09G 2380/02* (2013.01)

(58) Field of Classification Search
None
See application file for complete search history.

(56) References Cited

U.S. PATENT DOCUMENTS

2006/0274036 A1 12/2006 Hioki et al.
2009/0219247 A1 9/2009 Watanabe et al.
(Continued)

FOREIGN PATENT DOCUMENTS

CN 101640712 A 2/2010
CN 102089737 A 6/2011
(Continued)

OTHER PUBLICATIONS

Extended European Search Report dated May 9, 2017, in corresponding European Application No. 13199085.5 (9 pages, in English).
(Continued)

*Primary Examiner* — Joseph Haley
(74) *Attorney, Agent, or Firm* — NSIP Law

(57) ABSTRACT

A method for interacting with a flexible device and a user terminal thereof includes detecting a physical transformation of the flexible device, and performing an interaction, in association with the flexible device, corresponding to the physical transformation.

20 Claims, 18 Drawing Sheets

(51) Int. Cl.
  *G06F 3/0487* (2013.01)
  *G06F 1/16* (2006.01)
  *G06F 3/01* (2006.01)
  *H04M 1/02* (2006.01)
  *H04M 1/725* (2006.01)

(56) References Cited

U.S. PATENT DOCUMENTS

| | | |
|---|---|---|
| 2010/0011291 A1 | 1/2010 | Nurmi |
| 2010/0045705 A1 | 2/2010 | Vertegaal et al. |
| 2010/0053072 A1 | 3/2010 | Cohen et al. |
| 2011/0183722 A1 | 7/2011 | Vartanian |
| 2011/0298691 A1 | 12/2011 | DeLuca et al. |
| 2012/0112994 A1 | 5/2012 | Vertegaal et al. |
| 2012/0115422 A1 | 5/2012 | Tziortzis et al. |
| 2012/0133621 A1 | 5/2012 | Kim |
| 2012/0319960 A1 | 12/2012 | Kildal et al. |
| 2013/0044215 A1 | 2/2013 | Rothkopf et al. |
| 2013/0227418 A1 | 8/2013 | Sa et al. |
| 2013/0293453 A1 | 11/2013 | Hwang |

FOREIGN PATENT DOCUMENTS

| | | |
|---|---|---|
| CN | 102685318 A | 9/2012 |
| EP | 0 899 651 A2 | 3/1999 |
| EP | 2 194 446 A3 | 4/2013 |
| KR | 10-2007-0094335 A | 9/2007 |
| KR | 10-2010-0027501 A | 3/2010 |
| KR | 10-2010-0069053 A | 6/2010 |
| KR | 10-2011-0028650 A | 3/2011 |
| KR | 10-2012-0011271 A | 2/2012 |
| KR | 10-2012-0065924 A | 6/2012 |
| KR | 10-2012-0093148 A | 8/2012 |
| WO | WO 00/25193 | 5/2000 |
| WO | WO 2014/046492 A3 | 3/2014 |

OTHER PUBLICATIONS

Chinese Office Action dated Mar. 29, 2017, in corresponding Chinese Application No. 201310712596.3 (23 pages in English, 14 pages in Chinese).

Korean Office Acion dated Oct. 24, 2017, in corresponding Korean Application No. 10-2012-0154842 (11 pages in English, 9 pages in Korean).

METHOD FOR INTERACTING WITH FLEXIBLE DEVICE AND USER TERMINAL THEREOF

CROSS-REFERENCE TO RELATED APPLICATIONS

This application is a Continuation of U.S. application Ser. No. 14/016,554, filed on Sep. 3, 2013 which claims the benefit of Korean Patent Application No. 10-2012-0154842, filed on Dec. 27, 2012, the entire disclosures of which are incorporated herein by reference for all purposes.

BACKGROUND

1. Field

The following description relates to a method for performing an interaction between devices using a physical transformation of a flexible device, and a user terminal thereof.

2. Description of the Related Art

Recently, research and development is being conducted in earnest for a flexible device able to be folded or bent. Most notably, technological developments of a flexible display have observed a great deal of progress, and flexible device-related technology is expected to be a base technology in the future through being applied to a mobile device and household items.

The flexible display may refer to a display achieving flexibility of a panel by a glass substrate, protecting a liquid crystal in a liquid crystal display (LCD) and an organic light-emitting diode (OLED), being replaced with a plastic film. The flexible display may be thin, light, shock-resistant, and manufactured in various forms.

SUMMARY

The foregoing and/or other aspects may be achieved by providing a method for interacting with a flexible device to be performed by a user terminal, the method including detecting a physical transformation of the flexible device, and performing an interaction, in association with the flexible device, corresponding to the physical transformation.

The performing of the interaction, in association with the flexible device, corresponding to the physical transformation may include determining a directivity of the interaction based on a spatial position relationship between the flexible device and the user terminal.

The performing of the interaction, in association with the flexible device, selected by the user may include determining a directivity of the interaction based on a spatial position relationship between the flexible device and the user terminal.

The foregoing and/or other aspects may be achieved by providing a method for interacting with a flexible device to be performed by a user terminal, the method including detecting whether the flexible device wraps around the user terminal, and performing a predetermined interaction in association with the flexible device when the flexible device wraps around the user terminal.

The foregoing and/or other aspects may be achieved by providing a method for interacting with a flexible device, the method including detecting a folding of the flexible device when the user terminal is adjacent to the flexible device, and performing an interaction in association with the flexible device corresponding to the folding.

The foregoing and/or other aspects may be achieved by providing a method for interacting with a flexible device, the method including detecting a physical transformation of the flexible device, and performing an interaction in association with the user terminal corresponding to the physical transformation.

The performing of the interaction with the user terminal corresponding to the physical transformation may include determining a hierarchy or a role of the user terminal based on a spatial position relationship between the flexible device and the user terminal.

The foregoing and/or other aspects may be achieved by providing a user terminal, including a physical transformation detecting unit to detect a physical transformation of a flexible device, and an interaction performing unit to perform an interaction in association with the flexible device corresponding to the physical transformation.

The foregoing and/or other aspects may be achieved by providing a user terminal, including an interface providing unit to provide an interface to a user for selecting an interaction type when a physical transformation of the flexible device is detected, and an interaction performing unit to perform the interaction in association with the flexible device selected by the user.

The foregoing and/or other aspects may be achieved by providing a method for initiating a data transfer, the method including deforming, by a user, a flexible display on a first device, detecting the deformation of the flexible display by a second device, and performing a data transfer between the flexible first device and the second device.

The type of the data transfer performed may be based on a manner of the detected deformation.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1A:
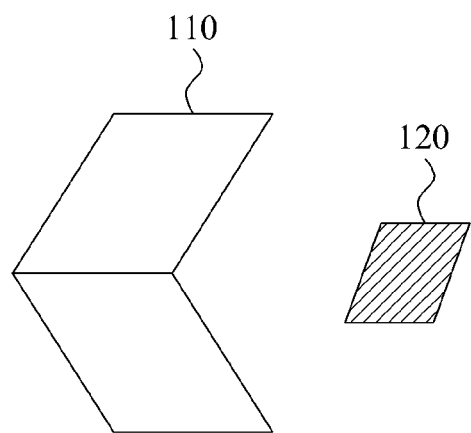
FIGS. 1A and 1B illustrate examples in which a flexible device and a user terminal perform an interaction according to example embodiments.

Reference will now be made in detail to embodiments, examples of which are illustrated in the accompanying drawings, wherein like reference numerals refer to like elements throughout. Embodiments are described below to explain the present disclosure by referring to the figures.

Figure 1B:
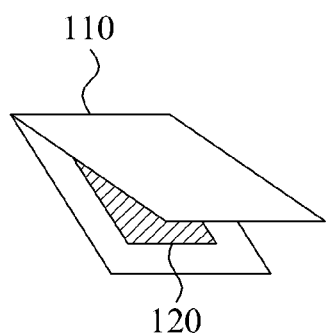

FIGS. 1A and 1B illustrate examples in which a flexible device 110 and a user terminal 120 perform an interaction according to example embodiments.

FIG. 1A illustrates the flexible device 110 and the user terminal 120. The flexible device 110 may have a physical transformational property, such as a bending, a folding, or a wrapping, for example. The flexible device 110 may be rolled or folded in a zig-zag pattern. The flexible device may be manipulated to form a curved shape or bent at an angle, or both, using flexible circuit technology. Although FIG. 1A illustrates a rectangular shaped flexible device and user terminal, the disclosure is not limited thereto. For example, the flexible device and user terminal may be provided in a substantially flat circular shape, or may be provided in a toroid or a ring shape.

The user terminal 120 may perform an interaction with the flexible device 110, such as data communication, for example. The user terminal 120 may have an identical physical transformational property as the flexible device 110, but is not limited to the physical transformational property of the flexible device 110.

FIG. 1B illustrates the flexible device 110 wrapping around the user terminal 120 using a physical property of folding. The flexible device 110 or the user terminal 120 may detect a physical transformation of the flexible device 110 and perform an interaction predetermined between the flexible device 110 and the user terminal 120 when the flexible device 110 wraps around the user terminal 120.

For example, when the user terminal 120 approaches the flexible device 110, and the flexible device 110 wraps around the user terminal 120, data may be transmitted from the flexible device 110 to the user terminal 120 based on a predetermined setting. Alternatively, when the flexible device 110 detects the user terminal 120 approaching the user terminal 120, and detects a physical transformation being performed by an operation of a user, the flexible device may attempt to connect to the user terminal 120 with Bluetooth, for example.

The flexible device 110 and the user terminal 120 may induce an interaction to be performed by transmitting a signal for performing an interaction to another device when the physical transformation of the flexible device 110 is detected. The flexible device 110 or the user terminal 120 receiving a corresponding signal may perform an interaction corresponding to the physical transformation.

When the user terminal 120 is manufactured with a flexible material, the flexible device 110 and the user terminal 120 may detect a physical transformation of the user terminal 120, and perform an interaction corresponding to the detected physical transformation. The flexible device 110 and the user terminal 120 may perform an interaction based on the physical transformation of the flexible device 110 as well as the physical transformation of the user terminal 120.

As such, the flexible device 110 and the user terminal 120 may perform an intuitive interaction between the flexible device 110 and the user terminal 120, based on the physical transformational property of the flexible device 110. A user may conveniently use the flexible device 110 or the user terminal 120 by implementing an intuitive interface scheme, rather than a conventional touch scheme and an input scheme using a keyboard.

The interaction performed by the flexible device 110 and the user terminal 120 may be predetermined by a user, and the interaction may be determined based on a disposition at which the flexible device 110 and the user terminal 120 are disposed spatially, or a type of a physical transformation applied to the flexible device 110.

The flexible device 110 may detect a physical transformation performed by an operation of a user. When the physical transformation is detected, the flexible device 110 may perform an interaction, in association with the user terminal 120, corresponding to the physical interaction.

When a plurality of user terminals 120 may perform an interaction, the flexible device 110 may form a hierarchical structure between the flexible device 110 and the user terminal 120 by identifying a type of each of the plurality of user terminals 120, and based on a spatial position relationship between the flexible device 110 and the user terminal 120, may determine a hierarchy or a role of each of the plurality of user terminals 120. For example, the flexible device 110 may set the plurality of user terminals 120 to perform other functions based on a distance between the flexible device 110 and the flexible device 110, or a position of the plurality of user terminals 120 measured based on the flexible device 110. When the plurality of user terminals 120 may perform an interaction, the flexible device 110 may perform an interaction, such as transmitting data, for example, to the plurality of user terminals 120 simultaneously.

Figure 2:
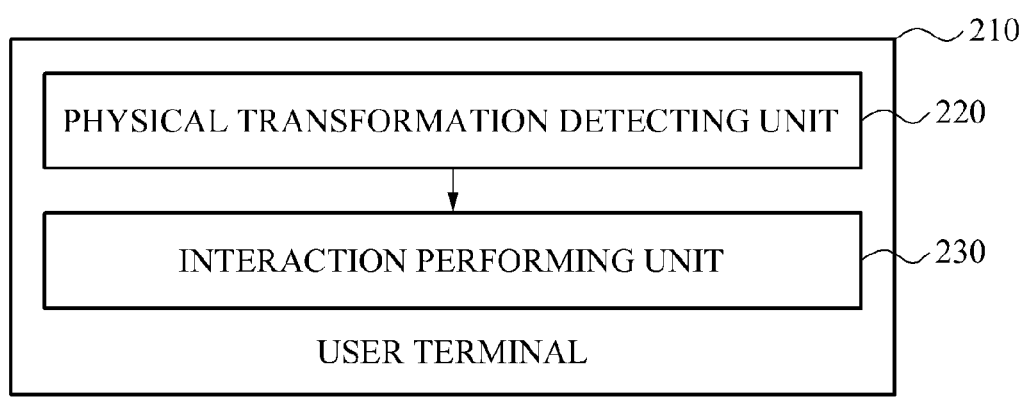
FIG. 2 illustrates a detailed configuration in which a user terminal performs an interaction with a flexible device according to example embodiments.

FIG. 2 illustrates a detailed configuration in which a user terminal 210 performs an interaction with a flexible device according to example embodiments.

Referring to FIG. 2, the user terminal 210 performing an interaction with the flexible device may include a physical transformation detecting unit, or detector, 220 and an interaction performing unit, or performer, 230.

The physical transformation detecting unit 220 may detect a physical transformation of the flexible device. For example, the physical transformation detecting unit 220 may detect at least one physical transformation from among a bending, a folding, and a wrapping of the flexible device using a sensor, for example. More particularly, the physical transformation detecting unit 220 may detect a type of a physical transformation performed on the flexible device, a time at which the physical transformation occurs, or an order in which the physical transformation occurs, for example.

Alternatively, the user terminal 210 may receive, from the flexible device, a signal indicating an occurrence of a physical transformation, and the physical transformation detecting unit 220 may detect the physical transformation of the flexible device via the received signal. The received signal may further include information on the type of the physical transformation performed on the flexible device, the time at which the physical transformation occurs, or content of the interaction to be performed. The interaction performing unit 230 may perform an interaction with the flexible device by identifying, from the signal received from the flexible device, the content of the interaction to be performed.

The interaction performing unit 230 may perform an interaction, in association with the flexible device, corresponding to a physical transformation. For example, when the physical transformation detecting unit 220 detects the flexible device being wrapped around the user terminal 210, the interaction performing unit 230 may perform a predetermined interaction, in association with the flexible device, automatically.

When the physical transformation of the flexible device is detected, the interaction performing unit 230 may perform a predetermined operation with the flexible device, such as performing data communication with the flexible device, or establishing a server-client relationship with the flexible device, for example. Alternatively, when the physical transformation of the flexible device is detected, the interaction performing unit 230 may connect to an auxiliary device, for example, connecting the flexible device to a Bluetooth device, and the like, and when a plurality of flexible devices or a plurality of user terminals 210 exists, may perform an operation of selecting a central hub between the flexible devices and the plurality of user terminals 210.

As an example, when the physical transformation detecting unit 220 detects a folding of the flexible device when the user terminal 210 is adjacent to the flexible device, the interaction performing unit 230 may perform an interaction, in association with the flexible device, corresponding to the folding. The interaction performing unit 230 may perform an interaction based on at least one of a portion of the folding, an area being folded, and a shape resulting from the folding.

The interaction performing unit 230 may perform an interaction based on at least one of a number of times at which the physical transformation occurs, a portion of a device at which the physical transformation occurs, and a time at which the physical transformation occurs. For example, the interaction performing unit 230 may set the number of times at which the physical transformation occurs or the portion of a device at which the physical transformation occurs to be a parameter, and perform an interaction based on a plurality of parameter values. In this instance, although a type of the physical transformation may be identical, the interaction performing unit 230 performs different interactions based on the time at which the physical transformation occurs.

The interaction performing unit 230 may determine a directivity of the interaction based on a spatial position relationship between the flexible device and the user terminal 210. For example, the interaction performing unit 230 may determine at least one of a direction of data transmission and a server-client relationship between the flexible device and the user terminal 210, based on the spatial position relationship.

Alternatively, the interaction performing unit 230 may determine the directivity of the interaction based on a type of the physical transformation occurring on the flexible device. For example, the interaction performing unit 230 may set the direction of the data transmission of the flexible device to be different from the direction of the data transmission of the user terminal 210 based on whether the physical transformation is a bending or a folding. The interaction performing unit 230 may set the flexible device to be a server or a client based on a type of the physical transformation.

Figure 3:
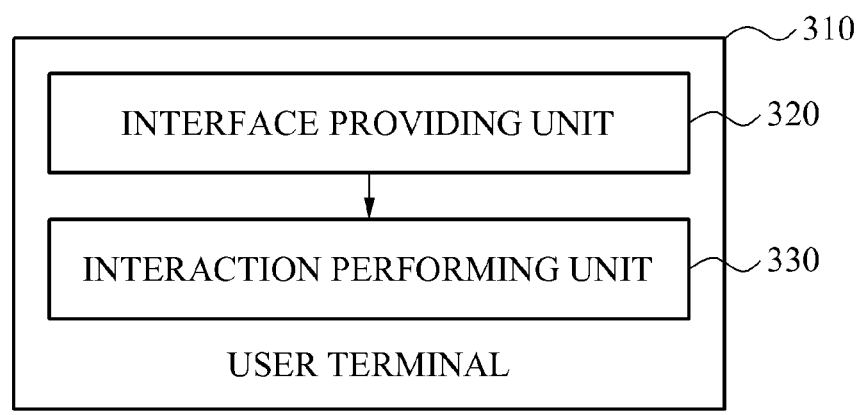
FIG. 3 illustrates a detailed configuration in which a user terminal performs an interaction with a flexible device according to example embodiments.

FIG. 3 illustrates a detailed configuration in which a user terminal 310 performs an interaction with a flexible device according to example embodiments.

Referring to FIG. 3, the user terminal 310 for performing an interaction with the flexible device may include an interface providing unit, or provider, 320 and an interaction performing unit, or performer, 330.

The interface providing unit 320 may provide a user with an interface for selecting a type of interaction when a physical transformation of the flexible device is detected. For example, the interface providing unit 320 may provide the user with the interface for selecting a type of interaction when at least one physical transformation of the flexible device is detected from among a bending, a folding, and a wrapping.

For example, when the user terminal 310 detects a physical transformation of the flexible device or receives, from the flexible device, a signal indicating an occurrence of the physical transformation, the interface providing unit 320 may provide the user with the interface for selecting the type of interaction. In this example, the user may select the type of interaction to be performed through the interface.

The interaction performing unit 330 may perform the interaction, in association with the flexible device, selected by the user. For example, when the user selects an interaction of data communication, the interaction performing unit 330 may perform the data communication between the flexible device and the user terminal 310. The user may additionally set, through the interface, a direction of data transmission, and content of data to be transmitted. Accordingly, the interaction performing unit 330 may perform the data communication based on the setting by the user.

The interaction performing unit 330 may determine a directivity of the interaction based on a spatial position relationship between the flexible device and the user terminal 310. For example, the interaction performing unit 330 may determine a direction of data transmission or a server-client relationship, for example, between the flexible device and the user terminal 310 based on the spatial position relationship. When a physical transformation of the flexible device occurs through the flexible device being folded by overlapping with a portion of the user terminal 310, data stored in the user terminal 310 may be transmitted to the flexible device. When the physical transformation of the flexible device occurs through the flexible device being folded while the user terminal 310 fails to overlap a portion of the flexible device, an interaction of transmitting data stored in the flexible device to the user terminal 310 may be performed.

Alternatively, the interaction performing unit 330 may determine a directivity of the interaction based on a type of a physical transformation performed on the flexible device. For example, the interaction performing unit 330 may set a direction of data transmission between the flexible device and the user terminal 310 based on whether the physical transformation is a bending or a folding.

FIGS. 4A to 4D illustrate examples in which an interaction is performed when a bending occurs on a flexible device 410 according to example embodiments.

Figure 4A:
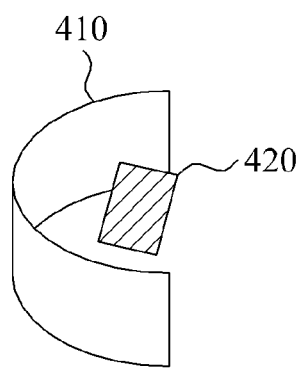
FIGS. 4A to 4D illustrate examples in which an interaction is performed when a bending occurs on a flexible device according to example embodiments.
Figure 4B:
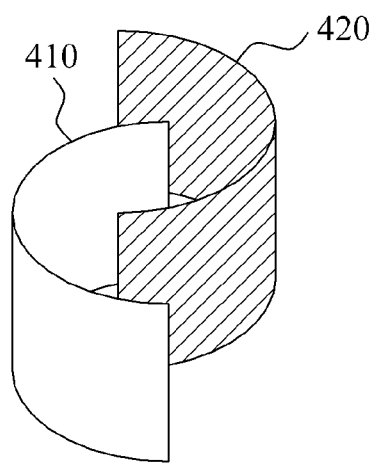
Figure 4C:
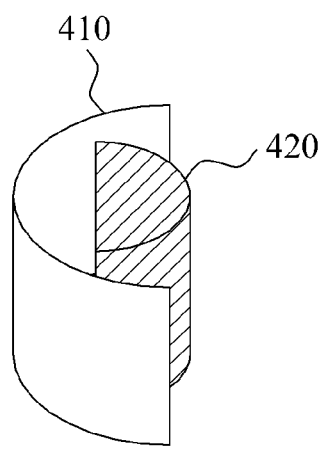
Figure 4D:
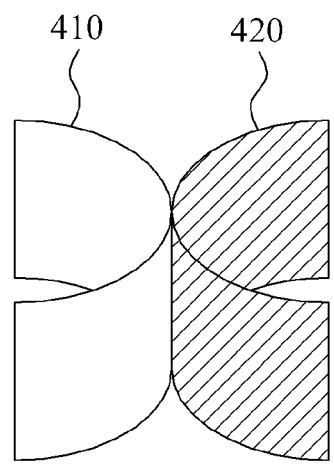

FIGS. 4A through 4D illustrate examples in which a physical transformation of bending occurs on the flexible device 410. As shown in FIGS. 4B, 4C, and 4D, a user terminal 420 may also be manufactured with a flexible material, and the physical transformation of bending may occur on the user terminal 420. Accordingly, an interaction between the flexible device 410 and the user terminal 420 may be performed based on the physical transformation of the user terminal 420 as well as the physical transformation of the flexible device 410.

FIG. 4A illustrates an example in which the user terminal 420 is disposed inside the flexible device 410 when the flexible device 410 is bent. The user terminal 420 and the flexible device 410 may detect a physical transformation occurring on the flexible device 410, and perform a predetermined interaction. According to an embodiment, when the user terminal 420 detects the physical transformation of the flexible device 410, an interface for selecting an interaction type may be provided to a user.

FIGS. 4B, 4C, and 4D illustrate examples in which a physical transformation of bending occurs on both the flexible device 410 and the user terminal 420. FIG. 4B illustrates an example in which the flexible device 410 and the user terminal 420 are bent to intersect one another. FIG. 4C illustrates an example in which the flexible device 410 is bent in a manner that the flexible device 410 wraps around the user terminal 420 to be included inside the flexible device 410. FIG. 4D illustrates an example in which the flexible device 410 and the user terminal 420 are bent while being pressed together. FIGS. 4B, 4C, and 4D may be distinguished to perform different interactions from one another.

FIGS. 5A to 5E illustrate examples in which an interaction is performed when a folding occurs on a flexible device 510 according to example embodiments.

Figure 5A:
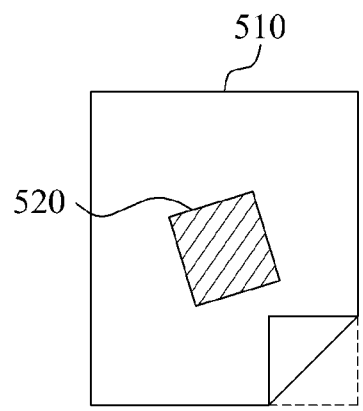
FIGS. 5A to 5E illustrate examples in which an interaction is performed when a folding occurs to a flexible device according to example embodiments.
Figure 5B:
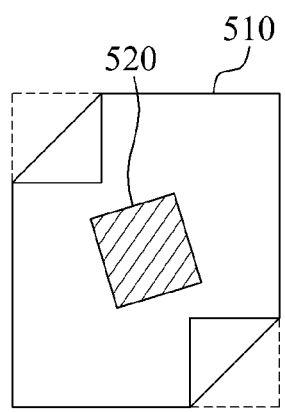
Figure 5C:
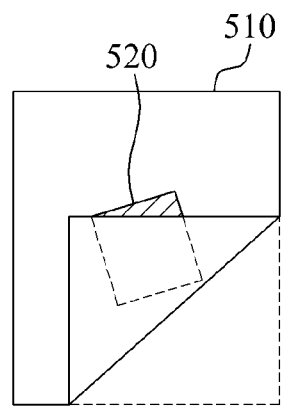
Figure 5D:
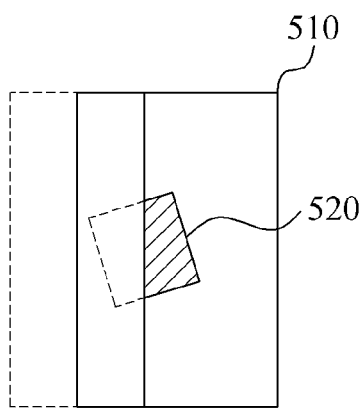
Figure 5E:
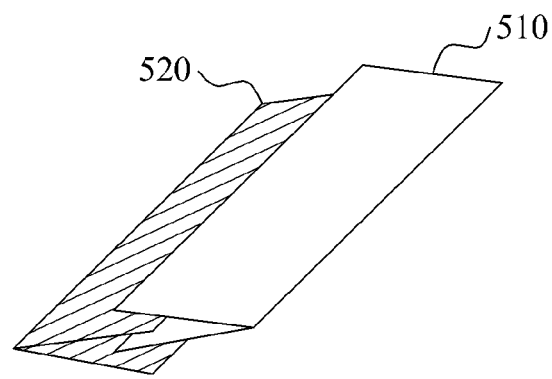

FIGS. 5A through 5E illustrate examples in which a physical transformation of a folding occurs on the flexible device 510. As shown in FIG. 5E, the flexible device 510 may perform an interaction between the flexible device 510 and the user terminal 520 based on a physical transformation of the user terminal 520 as well as a physical transformation of the flexible device 510. The user terminal 520 or the flexible device 510 may perform different interactions from each other based on a portion of the folding, an area being folded, or a shape resulting from the folding.

FIG. 5A illustrates an example in which the folding occurs on a lower right edge of the flexible device 510. The user terminal 520 and the flexible device 510 may detect a physical transformation on the flexible device 510, and perform an interaction corresponding to the physical transformation. FIG. 5B illustrates an example in which the folding occurs on a lower right edge and an upper left edge of the flexible device 510.

FIG. 5C illustrates an example in which a lower right edge of the flexible device 510 is folded to overlap the user terminal 520. FIG. 5D illustrates an example in which a left portion of the flexible device 510 is folded to overlap the user terminal 520. The user terminal 520 and the flexible device 510 may perform different interactions by distinguishing examples such as those illustrated in FIGS. 5C and 5D based on a shape resulting from the folding or the area being folded.

FIG. 5E illustrates an example in which the folding occurs on both of the flexible device 510 and the user terminal 520, and a portion of the flexible device 510 and a portion of the user terminal 520 are folded to overlap one another.

Figure 6A:
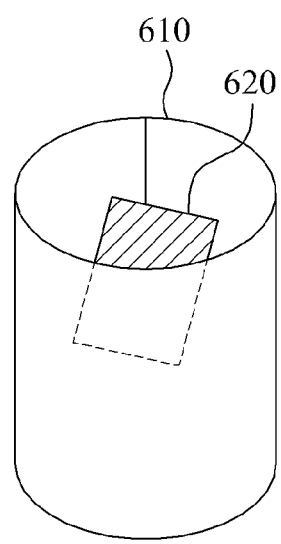
FIGS. 6A and 6B illustrate examples in which an interaction is performed when a flexible device wraps around a user terminal according to example embodiments.
Figure 6B:
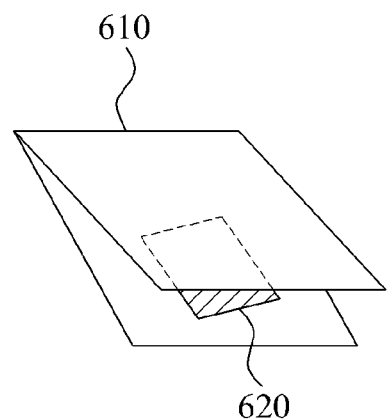

FIGS. 6A and 6B illustrate examples in which an interaction is performed when a flexible device 610 wraps around a user terminal 620 according to example embodiments.

Referring to FIG. 6A, an example in which the flexible device 610 is rolled to wrap around the user terminal 620 is illustrated. The user terminal 620 may detect the flexible device 610 being wrapped around the user terminal 620, and perform a corresponding interaction. FIG. 6B illustrates an example in which the flexible device 610 wraps around the user terminal 620 based on a folding property of the flexible device 610. The user terminal 620 and the flexible device 610 may perform different interactions based on the examples of FIGS. 6A and 6B. A user may initially set an interaction corresponding to FIG. 6A and an interaction corresponding to FIG. 6B.

Figure 7:
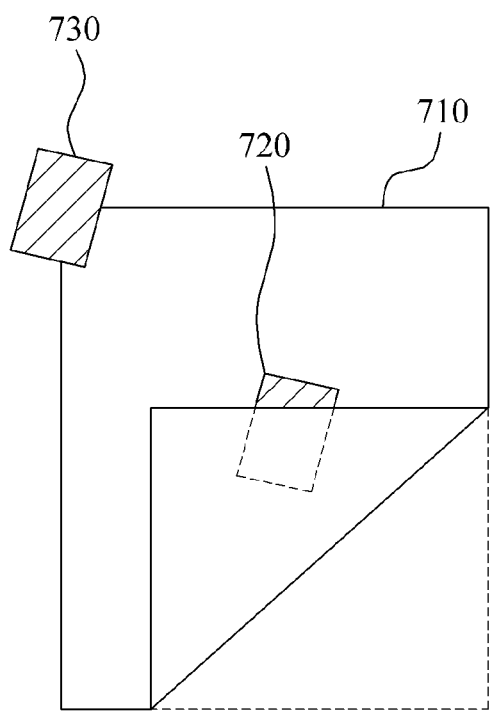
FIG. 7 illustrates an example in which a plurality of user terminals and a flexible device perform an interaction according to example embodiments.

FIG. 7 illustrates an example in which a plurality of user terminals 720 and 730 and a flexible device 710 perform an interaction according to example embodiments.

When a plurality of user terminals may perform an interaction, the flexible device 710 may form a hierarchical structure between the flexible device 710 and the plurality of user terminals 720 and 730. Referring to FIG. 7, the flexible device 710 may form the hierarchical structure including the flexible device 710 and the plurality of user terminals 720 and 730 when the flexible device 710 detects an approach of the plurality of user terminals 720 and 730. Subsequently, the flexible device 710 may determine a hierarchy or a role of the plurality of user terminals 720 and 730 based on a spatial position relationship of the plurality of user terminal 720 and 730.

For example, when the plurality of user terminals is detected, and a lower right edge of the flexible device 710 is folded, predetermined interaction in which the hierarchical structure is formed between the flexible device 710 and the plurality of user terminals 720 and 730 occurs. As shown in FIG. 7, the flexible device 710 may form the hierarchical structure including the plurality of user terminals 720 and 730 when the plurality of user terminals 720 and 730 is detected and a physical transformation of a folding occurs on the lower right edge of the flexible device 710. The flexible device 710 may set a first user terminal 720 to be a first layer and a second user terminal 730 to be a second layer based on the hierarchical structure. Data transmitted by the flexible device 710 may be transmitted to the second user terminal 730 via the first user terminal 720. Descriptions in the foregoing are provided to describe a process in which the plurality of user terminals 720 and 730 performs an interaction in the hierarchical structure. However, embodiments of the present invention are not limited thereto.

According to an embodiment, when a user terminal detected is plural and a lower right edge of the flexible device 710 is folded, the flexible device 710 may perform an interaction of transmitting data to the plurality of user terminals 720 and 730 simultaneously, or setting the flexible device 710 to be a server and setting the plurality of user terminals 720 and 730 to be a client.

Figure 8:
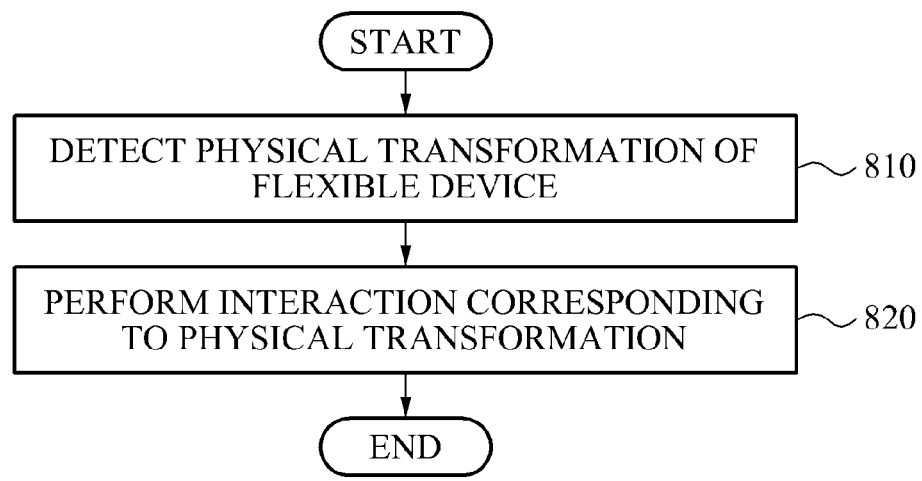
FIG. 8 is a flowchart illustrating an operation of performing an interaction with a flexible device according to example embodiments.

FIG. 8 is a flowchart illustrating an operation of performing an interaction with a flexible device according to example embodiments.

In operation 810, a user terminal may detect a physical transformation of the flexible device. For example, the user terminal may detect at least one physical transformation from among a bending, a folding, and a wrapping of the flexible device using a sensor, for example. More particularly, the user terminal may detect a type of the physical transformation performed on the flexible device, a time at which the physical transformation occurs, and an order of which the physical transformation occurs, for example.

Alternatively, the user terminal may receive, from the flexible device, a signal indicating that a physical transformation has occurred, and detect the physical transformation of the flexible device via the received signal. A corresponding signal may further include information on a type of the physical transformation occurring on the flexible device, a time at which the physical transformation occurs, or content of interaction to be performed.

In operation 820, the user terminal may perform an interaction, in association with the flexible device, corresponding to the physical transformation. For example, when the user terminal detects whether the user terminal wraps around the flexible device, the user terminal may perform a predetermined interaction in association with the flexible device.

When the physical transformation of the flexible device is detected, the user terminal may perform data communication with the flexible device, or perform a predetermined operation, in association with the flexible device, such as establishing a server-client relationship with the flexible device. Alternatively, when the physical transformation of the flexible device is detected, the user terminal may perform a connecting operation of an auxiliary device, for example, connecting the flexible device to a Bluetooth device.

As an example, when the user terminal detects a folding of the flexible device when the user terminal is adjacent to the flexible device, the user terminal may perform an interaction, in association with the flexible device, corresponding to the folding. The user terminal may perform an interaction based on at least one of a portion at which the folding occurs, an area being folded, and a shape resulting from the folding. The user terminal may perform different interactions based on the portion at which the folding occurs, the area being folded, and the shape resulting from the folding.

The user terminal may perform an interaction based on at least one of a number of times at which a physical transformation occurs, a portion of a device at which the physical transformation occurs, and a time at which the physical transformation occurs. For example, the user terminal may set the number of times at which the physical transformation occurs or the portion of a device at which the physical transformation occurs to be a parameter, and perform an interaction based on a plurality of parameter values. Also, the user terminal may perform different interactions based on the time at which the physical transformation occurs although a type of the physical transformation is identical.

The user terminal may determine a directivity of the interaction based on a spatial position relationship between the flexible device and the user terminal. For example, the user terminal may determine a direction of data transmission or a server-client relationship between the flexible device and the user terminal based on the spatial position relationship.

Alternatively, the user terminal may determine a directivity of the interaction based on the type of the physical transformation occurring on the flexible device. For example, the user terminal may set a direction of data transmission between the flexible device and the user terminal based on whether the physical transformation is a bending or a folding.

Figure 9:
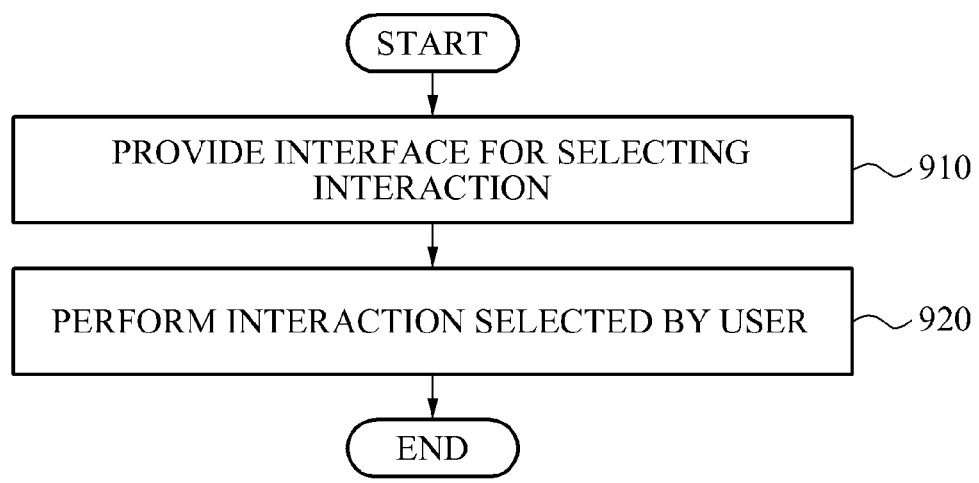
FIG. 9 is a flowchart illustrating an operation of performing an interaction with a flexible device according to example embodiments.

FIG. 9 is a flowchart illustrating an operation of performing an interaction with a flexible device according to example embodiments.

In operation 910, when a physical transformation of the flexible device is detected, a user terminal may provide a user with an interface for selecting a type of interaction. For example, the user terminal may provide a user with an interface when at least one physical transformation is detected from among a bending, a folding, and a wrapping.

For example, when a physical transformation of the flexible device is detected, or a signal indicating that a physical transformation occurs is received from the flexible device, the user terminal may provide the user with the interface for selecting a type of interaction. In this example, the user may select the type of interaction to be performed via the interface.

In operation 920, the user terminal may perform the interaction, in association with the flexible device, selected by the user. For example, when the user selects an interaction of data communication, the user terminal may perform data communication between the flexible device and the user terminal. The user may additionally set, through the interface, a direction of data transmission and content of data to be transmitted, and the user terminal may perform the data communication based on the setting of the user.

The user terminal may determine a directivity of the interaction based on a spatial position relationship between the flexible device and the user terminal. For example, the user terminal may determine a direction of data transmission or a server-client relationship between the flexible device and the user terminal based on the spatial position relationship.

Alternatively, the user terminal may determine a directivity of the interaction based on a type of a physical transformation occurring on the flexible device. For example, the user terminal may set a direction of data transmission between the flexible device and the user terminal based on whether the physical transformation is a bending or a folding.

A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), and an automotive navigation system (for example, a global positioning system), for example. Also, the portable device as used throughout the present specification includes a digital camera, and a plasma display panel, for example.

The method for interacting with the flexible device and the user terminal thereof according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A user terminal, comprising:
a physical transformation detector configured to detect a physical transformation of a flexible device; and
an interaction performer configured to
determine, based on a spatial position relationship between the user terminal and the flexible device, whether to transfer data from the user terminal to the flexible device or from the flexible device to the user terminal, and
transfer the data to the flexible device or receive the data from the flexible device, according to the result of the determination.

2. The user terminal of claim 1, wherein the physical transformation comprises at least one of a bending, a folding, and a wrapping of the flexible device.

3. The user terminal of claim 1, wherein the interaction performer is configured to perform an interaction based on at least one of a number of times the physical transformation occurs, a location of the flexible device at which the physical transformation occurs, and a time at which the physical transformation occurs.

4. The user terminal of claim 1, wherein the interaction performer is configured to determine a directivity of the interaction based on a spatial position relationship between the flexible device and the user terminal.

5. The user terminal of claim 4, wherein the interaction performer is configured to determine a server-client relationship between the flexible device and the user terminal, based on the spatial position relationship.

6. The user terminal of claim 1, wherein the interaction performer is configured to determine a directivity of the interaction based on a type of the physical transformation.

7. The user terminal of claim 1, wherein the interaction performer is configured to determine at least one of a hierarchy and a role of the user terminal based on a spatial position relationship between the flexible device and the user terminal.

8. The user terminal of claim 1, wherein the interaction performer is configured to perform an interaction based on at least one of a device of the flexible device at which the folding occurs, an area being folded, and a shape resulting from the folding when the physical transformation is a folding of the flexible device.

9. A user terminal, comprising:
an interface provider configured to provide an interface for selecting an interaction type in response to a physical transformation of a flexible device being detected; and
an interaction performer configured to
determine, based on a spatial position relationship between the user terminal and the flexible device, whether to transfer data from the user terminal to the flexible device or from the flexible device to the user terminal, and
transfer the data to the flexible device or receive the data from the flexible device, according to the result of the determination.

10. The user terminal of claim 9, wherein the interaction performer is configured to determine a directivity of the interaction based on a spatial position relationship between the flexible device and the user terminal.

11. The user terminal of claim 9 wherein the interaction performer is configured to determine at least one of a hierarchy and a role of the user terminal based on a spatial position relationship between the flexible device and the user terminal.

12. The user terminal of claim 9, wherein the interaction comprises data communication between the user terminal and the flexible device.

13. The user terminal of claim 9, wherein the detection occurs via a signal, received from the flexible device, indicating an occurrence of the physical transformation.

14. The user terminal of claim 9, wherein the physical transformation comprises at least one of a bending, a folding, and a wrapping of the flexible device.

15. A method for initiating a data transfer, the method comprising:
establishing a data transfer parameter, via an interface, for a data transfer to be performed responsive to detection of a physical transformation of a flexible display;
detecting a deformation of the flexible display on a first device by a second device;
determining, based on a spatial position relationship between the first device and the second device, whether to perform a data transfer from the first device to the second device or from the second device to the first device; and
performing the data transfer, according to the established data transfer parameter, from the first device to the second device or from the second device to the first device.

16. The method of claim 15, wherein a type of the data transfer is based on a manner of the detected deformation.

17. The method of claim 15, wherein the detected deformation comprises at least one of a bending and a folding of the flexible display.

18. The method of claim 15, wherein the performing comprises determining a directivity of the data transfer based on a spatial position relationship between the first device and the second device.

19. The method of claim 15, wherein the first device transmits a signal indicating that the deformation has occurred in response to the flexible display being deformed.

20. The method of claim 19, wherein the signal includes at least one of information on a type of the deformation and a time at which the deformation occurs.

* * * * *